Nov. 7, 1939.  W. S. LANDON  2,178,839
CONTROL DEVICE
Filed Oct. 14, 1936
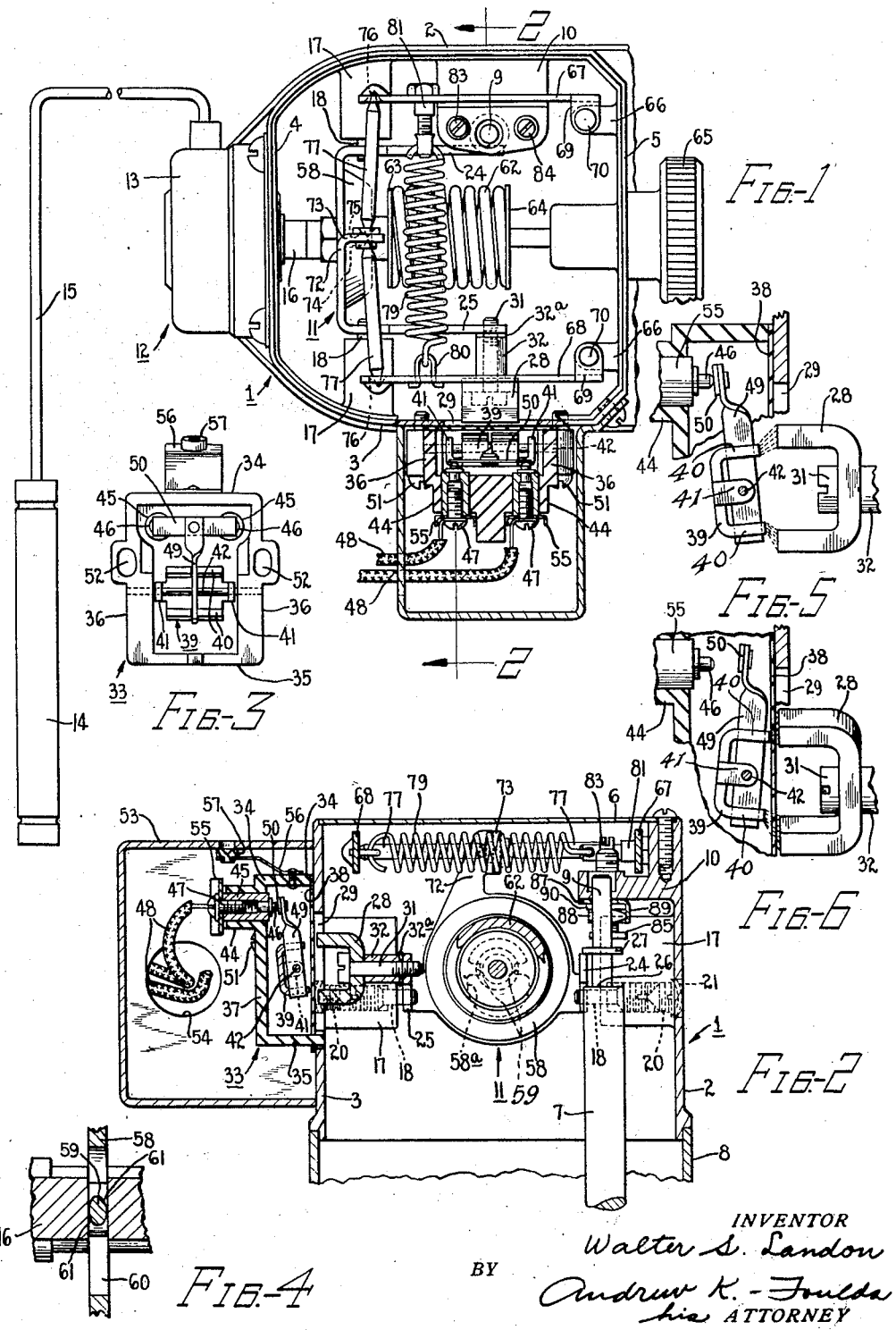
INVENTOR
Walter S. Landon
BY
Andrew K. Foulds
his ATTORNEY Patented Nov. 7, 1939

2,178,839

UNITED STATES PATENT OFFICE 2,178,839

CONTROL DEVICE

Walter S. Landon, Detroit, Mich., assignor to Detroit Lubricator Company, Detroit, Mich., a corporation of Michigan Application October 14, 1936, Serial No. 105,627

17 Claims. (Cl. 200—83)

My invention relates generally to control devices and more particularly to magnetically operated control switches.

One of the objects of my invention is to provide a control device for controlling the flow of a fluid and for operating switch means in conjunction with the control of the flow of the fluid.

Another object of my invention is to provide a new and improved magnetically operated switch means.

Another object of my invention is to provide a new and improved magnetically operated switch that will operate with a snap action so that arcing at the switch contacts will be prevented.

The invention consists in the improved construction and combination of parts, to be more fully described hereinafter and the novelty of which will be particularly pointed out and distinctly claimed.

In the accompanying drawing, to be taken as a part of this specification, I have fully and clearly illustrated my invention, in which drawing—

Figure 1 is a fragmentary top plan view shown partly in elevation and partly in cross section of my control device;

Fig. 2 is a view shown in cross section and taken along the line 2—2 of Fig. 1;

Fig. 3 is a view shown in elevation of a switch means employed in my device;

Fig. 4 is a view shown in cross section of a structural detail of my device;

Fig. 5 is an enlarged fragmentary view of a magnetically operated switch employed in my device and showing the switch in closed circuit position, and Fig. 6 is a view similar to Fig. 5 showing the magnetically operated switch in open circuit position.

Referring to the drawing by characters of reference the numeral 1 designates in general a hollow casing having side walls 2, 3 end walls 4, 5 and a top wall preferably in the form of a removable closure member or cover 6. The bottom of the casing 1 is open in the present instance, as shown in Fig. 2, and the casing is designed to be mounted on a second casing 8 containing an outlet and a valve port (not shown). The valve port is controlled by a vertically reciprocal valve member 7 which has a stem projecting upwardly into the casing 1. Preferably an upper end portion of the valve stem is of reduced diameter, as at 9, and is slidably received and guided in an aperture provided in a horizontally extending wall portion 10 within casing 1, the wall 10 preferably being integral of the casing side wall 2.

The valve member 7 is preferably actuated through a snap-acting mechanism including a lever 11, by a thermostatic power element designated in general by the numeral 12. The power element 12 may include a pressure responsive means such as a metallic bellows (not shown) enclosed in a casing 13 that may be rigidly secured to the end wall 4 of casing 1 by screws, or by other suitable means. The power element bellows provides an expansible chamber that may be communicatively connected to a bulb element 14 by a conduit or tube 15, providing a closed system for containing a temperature responsive, expansible-contractible fluid which may be methyl chloride. The movable end wall of the power element bellows carries a thrust member or rod 16 that projects into the casing 1 and is connected to the lever 11, the lever being pivotally supported by and within the casing 1, preferably adjacent the casing end wall 4.

Preferably the casing side walls 2, 3 are formed having inwardly projecting, aligned bosses 17 provided with aligned threaded apertures therethrough, and through the casing side walls, for receiving pivot pins 18 on which the lever 11 may be pivotally supported. The pivot pins 18 thread into the bosses 17 from externally of the casing 1, and inner end portions of the pins project past or beyond the inner end faces of the bosses into the casing. Preferably locking screws 20 are threaded into the bosses 17 in engagement with the outer ends of the pivot pins 18 to prevent movement of the pins from their desired positions. The apertures in the bosses 17 may be closed at their outer ends by disc-like closure members 21 that may be sprung into place in the apertures. Each of the pivot pins 18 is preferably provided with a recess in the form of a bore in its outer end, and the locking screws 20 are provided with pointed or conical ends to seat, one in each recess. When the pins 18 have been adjusted to their desired positions the locking screws 20 are then tightened and the pointed ends of the screws engaging in the recesses of the pins 18 cause the pins to expand circumferentially so that the threads of the pins will engage tightly with the walls of their apertures, and in this manner the pins may be securely held in place.

Preferably the lever 11 is of plate-like form and has spaced, substantially parallel arms 24 and 25 that extend longitudinally of the bellows thrust rod 16 toward the casing end wall 5, and these lever arms are provided with apertures adjacent the lever proper for receiving the pivot pins 18. One of the lever arms, or arm 24, engages the valve member 7 to transmit movement of the power element thrust rod 16 thereto. The upper reduced end portion of the stem of valve member 7 provides an upwardly facing annular shoulder or seating surface 26, and spaced from and above the shoulder 26 the stem is preferably provided with an annular flange 27, the shoulder and flange providing opposed, substantially horizontal bearing surfaces between which an end portion of the lever arm 24 positions for engaging said bearing surfaces to reciprocate the valve member 7.

Carried by and rigidly secured to the other lever arm 25, adjacent the free end thereof, there is a magnet 28, preferably of the U-shaped permanent type positioned outwardly of the lever arm 25 or between the lever arm and the casing side wall 3. The magnet 28 is preferably arranged with its poles positioned substantially one above the other and disposed in an opening 29 through the casing side wall 3, the poles of the magnet preferably being positioned adjacent the outer wall surface of side wall 3. The magnet 28 may be rigidly secured to the lever arm 25 by a screw 31 which may extend through an aperture in the base portion of the magnet 28 and may be secured into lever arm 25. In the present instance, the magnet 28 is spaced outwardly from the outer side of lever arm 25 by a tubular spacer member 32, and between the inner end of the spacer member and the outer side of the lever arm 25 there is preferably provided a washer member 32a formed of non-magnetic material to insulate the magnet 28 from lever 11.

Mounted on the side wall 3 of casing 1, externally thereof and removable therefrom as a unitary structure, there is a control means or switch mechanism operable by movement of the magnet 28, and the switch mechanism includes a support or base 33, preferably in the form of a box-like housing constructed of electric insulating material. The housing 33 has a top wall 34, bottom wall 35, end walls 36, and a side wall 37. The side of the housing 33 opposite side wall 37 is preferably open and overlies the opening 29 in casing side wall 3. Preferably a removable closure member in the form of a wall 38 is interposed between the switch housing 33 and the casing side wall 3, and the closure member 38 is preferably a thin sheet of non-magnetic, electric insulating material. Pivotally supported by and within the switch casing 33 there is an armature member 39 that is moved or pivoted by movement of the magnet 28. The armature 39 is preferably of channel or U-shape having spaced, substantially parallel sides or arms 40, the end edges of which are disposed toward and in close proximity to the poles of the magnet 28. The armature proper may be provided at its side edges with ears 41 having aligning apertures for receiving a shaft or pivot pin 42, the opposite ends of which may be secured in and to the casing end walls 36. The armature 39 is thus supported to pivot about its shaft 42 in a plane substantially transverse to the plane of movement of the magnet 28 about the fulcrum of lever 11. Adjacent the upper end of the switch casing 33 the side wall 37 thereof is provided with a pair of spaced, external tubular bosses 44 in each of which is rigidly secured a tubular shaped, electric terminal member 45. Fitted in the inner end of each of the terminal members 45 there is a contact member 46 that projects into the switch housing 33, and screw threaded into the outer end of each of the terminal members 45 there is a binding post or screw 47 for attaching wires, as at 48, to the binding posts. Carried by the armature 39, within housing 33, there is an upwardly extending switch arm 49, and secured to the upper end of switch arm 49 there is a contact member 50, preferably a metallic strip arranged to engage both of the contact members 46 to close an electric circuit. The sides of the channel-shaped armature 39 may be provided with aligned slots running out at their end edges, and the switch arm may be positioned in the slots and be rigidly secured to the armature, the switch arm preferably having an aperture therethrough for receiving the shaft 42. The switch housing 33 may be secured to the casing side wall 3 by screws 51, and preferably the apertures in the housing for receiving the screws are vertically extending slots, as at 52, so that the housing 33 can be adjusted vertically to adjust the position of the armature 39 relative to magnet 28.

The switch housing 33 is preferably enclosed in a conduit outlet box 53 having an opening 54 in a wall thereof through which the wires 48 enter the outlet box. Secured between the head of each of the binding screws 47 and the outer ends of the terminal posts 45 there is a metallic contact member 55, and overlying the contact members 55 there is a manually operable switch blade 56 cooperable with the contacts 55 to make and break the circuit. The switch blade 56 is preferably a strip of flexible or spring metal that may be secured at one end to the top wall 34 of switch housing 33, the switch blade 56 being under tension such that its free end tends to move upward out of engagement with the contacts 55. Preferably the manual switch blade 56 carries an upwardly facing button or bearing member 57 adjacent its free end, which button normally positions over and closes an aperture in the top wall of outlet box 53. In its upper end the button 57 may be provided with a socket in which a tool may be inserted to bend the flexible blade 56 down to engage and close the circuit across the contact members 55 without removing the outlet box 53.

Preferably the lever member 11 is formed having an embossed or offset portion 58 that extends away from the bellows or toward the casing end wall 5, and this embossed portion 58 may be circular in shape, as shown in Fig. 2. The offset portion 58 has an aperture 58a therethrough for receiving the bellows thrust rod 16, the rod extending through the apertures 58a at a point above the pivot pins of lever 11, as seen in Fig. 2. The aperture 58a is preferably a vertically extending slot and the side edges defining the slot are spaced from the outer periphery of the rod 16. The side edges defining the slot 58a are provided with oppositely disposed, inwardly directed, aligned, extended portions or bearing members 59, inner end portions of which engage in an annular slot or recess 60 in the thrust rod 16, see Fig. 4. Opposite sides of the bearing members 59 are preferably rounded or have convex surfaces, as at 61, for engaging and rocking on the opposed wall surfaces defining slot 60, the convex surfaces 61 also reducing friction between the rectilinearly movable thrust rod 16 and the pivotal lever 11. The thermostatic power element 12 acts to move the lever 11 in one direction to move the valve member 7 downward, and preferably a helical coil spring 62 is provided to oppose the power element and move the lever in the opposite direction, the force exerted by spring 62 thus determining the temperature at which the lever 11 will be actuated. The inner end of thrust rod 16 engages an abutment member 63 against which one end of the spring 62 abuts, the other end of the spring abutting a similar abutment member 64 that is preferably movably adjustable by means of a knob or handle 65 mounted on the casing end wall 5. Integral with the casing end wall 5 there is a pair of spaced, horizontally extending lugs or bosses 66 that project into the casing toward the opposite end wall thereof, and these bosses are preferably located adjacent the upper end of the casing 1 and positioned one adjacent each of the opposite side walls thereof. A pair of plate-like lever members 67 and 68 are pivotally supported one on each of the lugs 66, and extend therefrom substantially parallel to each other toward the opposite casing end wall 4. The lever members 67, 68 may be formed at their pivoted ends having spaced, substantially horizontal and parallel ears 69 between which the lugs 66 position, and the ears and lugs may be provided with aligning apertures to receive pivot pins 70 for pivotally connecting the levers to the supporting lugs 66. The levers 67, 68 are thus supported for pivotal movement in planes substantially transverse to the plane of movement of lever 11 about its fulcrum.

The lever 11 is formed having an upwardly directed arm 72 that is preferably formed at its upper end having an ear or flange portion 73 that is disposed substantially midway of lever arms 24 and 25, and extends toward the casing end wall 5 substantially parallel with the lever arms 24, 25. The flange portion 73 is provided with an aperture therethrough in which a bearing member 74 is positioned and rigidly secured thereto, and this bearing member is provided with sockets or conical recesses 75 in its opposed faces or ends. The free ends of the levers 67, 68 are positioned on opposite sides of the lever flange portion 73 and are provided with inwardly facing sockets or conical recesses 76. The levers 67, 68 are connected to lever 11 by thrust members 77, preferably pins or rods which terminate at their opposite ends in conical points 78 seating in the pairs of sockets 75, 76. The pins 77 are held in the sockets 75, 76 in engagement with the levers 67, 68 by a tension spring 79 secured at its opposite ends to the levers, urging the levers toward each other. Preferably the spring 79 is of the helical coil type terminating at its ends in hooks, one of which cooperates in holding relation with a U-shaped loop member 80 connected to and carried by the lever 68. The other hooked end of the spring 79 engages in an aperture in an adjustment member 81 which is carried by the lever 67 and by means of which adjustment member the tension force of spring 79 may be regulated as desired. The sockets 76 of the levers 67, 68 are substantially in alignment with each other, and the sockets 75 of the lever 11 are preferably slightly out of alignment with the sockets 76 when the valve is in open position so that the pins 77 are slightly angularly disposed with their inner ends positioned closer to the power element 12 than their outer ends. The coil spring 79 exerts a force acting through the levers 67, 68 tending to pivot lever 11 in the opposite direction from that in which the lever is pivoted by its power element 12. When the combined forces exerted by the springs 79 and 62 are overcome by the power element 12, the valve 7 will be actuated with a snap-action by the power element and the temperature at which the power element will overcome the springs 79 and 62 may be determined or selected by adjusting the force exerted by spring 62.

Adjustably screw threaded into the extended wall portion 10 there is a pair of spaced, laterally positioned, adjustable stop members 83, 84, one for limiting movement of the valve 7 in a valve opening direction and the other for limiting movement of the valve in a valve closing direction. The stop members 83, 84 project below the underside of the wall 10 and at their lower ends preferably have external annular flanges 85 for abutment with the annular flange 27 of valve member 7, only one of the flanges 85 being shown in the present instance. The valve 7 extends between and longitudinally of the stop members 83, 84 and the stop member 83 is arranged to limit movement of the valve in a valve-opening direction while the stop member 84 is arranged to limit movement of the valve in a valve-closing direction. A plate member 87, preferably formed of spring sheet metal, is provided with apertures adapted to receive the stop members 83, 84 and is clamped flat against the underside of wall 10 by nuts 88 that thread onto the stop members. The plate member 87 has downturned flanges 89 that position flat against one of the sides of the hexagonal nuts 88 to prevent rotation of the nuts, and the flanges 89 also act to increase friction between the stop members 83, 84 and the nuts so that the stop members will not turn too easily and will thus be held against accidental movement. Resilient or spring means, preferably lock washers as at 90, are provided one between each of the nuts 88 and the plate member 87 to increase the resistance to movement of the turning of the screw-threaded stop members 84, 83 so that their adjustment will not be altered accidentally or through vibration of the device.

The operation of the herein described control device is as follows: When the fluid in the power element bulb 14 is heated to a predetermined temperature the power element 12 will overcome springs 62 and 79 and will pivot lever 11 with a snap-action in a direction to cause the valve 7 to be moved downward. The positions of the operating or moving parts shown in the drawing are the positions they will assume when the lever 11 has been moved through substantially half of its stroke or range of movement. When the parts are in these positions, on downward movement of the valve 7 the switch arm 49 will be in closed circuit position, as shown. When the lever 11 has been pivoted to a point substantially half-way of its range of movement, the magnet 28 carried thereby will have been moved down through an arc to the position shown in Figs. 1, 2 and 5, in which position the poles of the magnet will be in alignment with the end edges of the armature 39. The switch being in closed circuit position, will be tilted toward its cooperative contact members 46 so that the lower pole of the magnet 28 will be closer to the lower arm of the armature 39 than the upper pole of the magnet will be to the upper arm of the armature. However, as shown in Fig. 5 by the lines representing the magnetic flux, as the magnet moves further downward the upper pole of the magnet will move closer to the end of the upper armature arm while the lower magnet pole will move farther away from the end of the lower armature arm, or in other words the path that the magnetic flux will naturally take between the upper magnet pole and the end of the upper armature arm will become shorter, while the path that the magnetic flux will take between the lower magnet pole and the lower armature arm will become longer. Since the magnetic force is inversely proportional to the square of the distance, the greater attractive force will be for the upper arm of the armature, as the magnet moves downward, which will cause the armature to pivot in a clockwise direction, as seen in Fig. 2, to the position shown in Fig. 6, moving the switch 49 to open circuit position. When the attractive forces of the magnet poles acting on the ends of the armature 39 are unbalanced, as above described, the increase in the magnetic force tending to pivot the armature is rapid, with the result that the switch is moved with a snap-action. When the power element bulb 14 cools to a predetermined temperature the springs 62 and 79 will pivot lever 11, with a snap-action, in a direction to move valve member 7 upward. As the magnet 28 is moved upward by the lever 11 the distance becomes shorter between the lower magnet pole and the end of the lower armature arm, while the distance becomes greater between the upper magnet pole and the end of the upper armature arm, with the result that the armature 39 is pivoted in a counterclockwise direction, as seen in Fig. 2, moving switch arm 49 to engage the contact members 46 to close the circuit. Thus it will be seen that as the different parts or ends of the armature 39 are alternately exposed to predominating attraction, the armature and switch carried thereby are pivoted accordingly. The switch means may be employed to control any electrically operated means such as, for example, an electrically operated fan for providing a force draft for a heating apparatus, the fuel supply of which is controlled by the valve 7.

What I claim and desire to secure by Letters Patent of the United States is:

1. In a device of the character described, an armature fulcrumed intermediate its ends, a magnet arranged having its opposite poles disposed toward one side of said armature on opposite sides of the fulcrum of said armature, said magnet being movable to increase the effective magnetic force of one of its poles on said armature and at the same time to decrease the effective magnetic force of the other of its poles on said armature whereby to pivot said armature with a quick movement, means to move said magnet, and means operable by pivotal movement of said armature.

2. In a device of the character described, an armature member having a fulcrum intermediate its ends and arranged to pivot from one position to another, a magnet member arranged with its poles disposed toward one side of said armature member with the fulcrum of said armature member therebetween, one of said poles being closer to said armature member than the other of said poles when said armature member is in one or the other of its positions, one of said members being movable relative to the other of said members to change the effective force of said poles on opposite sides of the fulcrum of said armature member to pivot said armature member, means for moving said one member, and means actuated on pivotal movement of said armature member.

3. A device of the character described comprising a lever member, means for pivoting said lever member, a magnet carried by said lever member and having a pair of laterally positioned poles, a pivotally supported armature pivoted by movement of said magnet, said armature being supported to pivot in a plane substantially transverse to the plane of movement of said magnet about the fulcrum of said lever member and having a pair of spaced extended portions disposed toward and in close proximity to the poles of said magnet, one of said extended portions being attracted by one of the poles of said magnet and the other of said extended portions being attracted by the other of the poles of said magnet, said armature being pivoted with a snap-action by movement of said magnet when the effective attractive force of said magnet for one of said extended portions exceeds the effective attractive force of said magnet for the other of said extended portions, and switch means controlled by movement of said armature and including a switch arm carried by said armature.

4. In a device of the character described, a casing having an opening in a wall thereof, a movable magnet supported within said casing and having its poles disposed toward said opening, means for moving said magnet, a housing member mounted on said casing wall and closing the opening therethrough, an armature having spaced extended portions disposed one toward each of said magnet poles and fulcrumed at a point between said extended portions, said armature being pivoted in either direction by movement of said magnet so that the attractive force of the magnet for one of said extended portions will exceed the attractive force of the magnet for the other of said extended portions, and means actuated by movement of said armature.

5. In a device of the character described, a magnet member, a pivotally supported armature member arranged to pivot from one position to another, one of said members being movable relative to the other of said members to change the effect of said magnet member on said armature member to pivot said armature member, means for moving said one member, a contact member carried by said armature member, a contact member cooperable with said first-named contact member to control an electric circuit, a third contact member, said third-named contact member being located in the circuit between said second-named contact member and the source of electric energy, an outlet box enclosing said contact members, and a manually operable switch means within said outlet box, said manually operable switch means being cooperable with said third-named contact member to close the circuit irrespective of operation of said armature member and operable from externally of said outlet box.

6. In a device of the character described, a magnet movable from one position to another, switch means attracted by said magnet and actuated thereby to control an electric circuit, means for moving said magnet, a contact member in the circuit between said switch means and the source of electric energy, an outlet box enclosing said switch means and said contact member and having an opening in a wall thereof, and a manually operable switch in said outlet box and cooperable with said contact member to close the circuit irrespective of the operation of said first-named switch means, said manually operable switch being under tension and normally out of engagement with said contact member, said manually operable switch overlying and closing said opening so that said manually operable switch may be readily accessible from externally of said outlet box to close the circuit.

7. In a device of the character described, an armature fulcrumed intermediate its ends and movable from one position to another, a magnet arranged having its opposite poles disposed toward one side of said armature on opposite sides of said fulcrum, said magnet being movable in a plane substantially transverse to the plane of movement of said armature about its fulcrum and on movement moving one of said poles toward and the other of said poles away from said armature to pivot said armature, means operable to move said magnet, and means actuated by movement of said armature.

8. In a device of the character described, a casing, a fuel control valve having a stem extending into said casing, a switch carried by said casing externally thereof so that arcing at said switch will be separated from fuel at said valve stem, a movable magnet in said casing, an armature cooperable with said magnet and operable to move said switch, and means in said casing to move said valve and said magnet.

9. In a device of the character described, a casing, a fuel control valve having a stem extending into said casing, a switch carried by said casing externally thereof so that arcing at said switch will be separated from fuel at said valve stem, a movable magnet in said casing, an armature external of said casing cooperable with said magnet and operable to move said switch, a lever in said casing having operative connection with and for moving said stem and said magnet, and automatically acting means to move said lever.

10. In a device of the character described, a casing, a fuel control valve stem extending into said casing, a switch externally of said casing so that arcing at said switch will be separated from fuel at said valve stem, a lever pivoted in said casing and having an arm connected to said valve and having a second arm, a magnet carried by said second-named arm within said casing, an armature cooperable with said magnet and operable to move said switch, and means operable to pivot said lever in one direction to move said valve stem toward closed position and to move said armature to open said switch.

11. In a device of the character described, supporting means, an armature member supported intermediate the ends thereof for rocking movement, said member having an opening extending transverse to the axis of its movement, an arm secured in said opening and projecting in one direction therefrom, a contact member carried by the projecting portion of said arm, and a magnet for rocking said armature member.

12. In a device of the character described, supporting means, a channel-like armature member having a pair of outwardly extending flanges, a shaft extending parallel to and intermediate said armature member flanges, means supporting said member on said shaft intermediate said flanges for rocking movement, an arm secured to said shaft between said flanges and extending transversely thereto, a contact member carried by the projecting portion of said arm, and a magnet for rocking said armature member.

13. In a device of the character described, magnetically attracted means movable between predetermined limits, magnetic means, means operable to move said magnetic means into attracting relationship with said attracted means so that said attracted means is moved by the attractive force of said magnetic means with a quick movement to one of said predetermined limits, said third-named means being operable to move said magnetic means to a second position into attracting relationship with said attracted means so that said attracted means is moved by the attracting force of said magnetic means with a quick movement to the other of said predetermined limits.

14. In a device of the character described, magnetically attracted means movable in a plane and having two normal positions of rest, magnetic means, means operable to carry and to move said magnetic means into attracting relationship with said attracted means so that said attracted means is moved by the attracting force of said magnetic means with a quick movement to one of said normal positions, said third-named means being operable to move said magnetic means to a second position into attracting relationship with said attracted means so that said attracted means is moved by the attracting force of said magnetic means with a quick movement to the other of said normal positions, and automatic means for moving said third-named means in a plane transverse to the plane of movement of said attracted means.

15. In a device of the character described, a casing having an opening in a wall thereof, a housing member mounted on said casing wall and closing the opening therethrough, an armature having two spaced positions of rest and having a pair of spaced extended portions disposed toward said opening, means pivotally supporting said armature intermediate said extended portions, magnetic means movable between said predetermined limits within said casing and having a pair of disposed poles extending toward said extended portions, means for moving said magnetic means toward one of said predetermined limits so that one of said extending poles attracts one of said extended portions with a relatively greater force than the other of said poles attracts the other of said extended portions to cause said armature to pivot to one of said positions with a quick movement, said moving means also being operable to move said magnetic means toward the other of said predetermined limits so that said other pole attracts said other portion with greater force than said first pole attracts said first extended portion to cause said armature to pivot with a quick movement to the other of said positions.

16. A device of the character described, comprising a casing having a reservoir for liquid fuel, a switch mounted on said casing external of said reservoir and having two positions, said casing having a wall portion of non-magnetic material separating said switch from said reservoir, an armature operatively connected to said switch and positioned adjacent said wall portion, a movable magnet in said reservoir and cooperable with said armature through said wall portion for moving said switch with a snap action into one of said positions, said magnet at another position being operable to move said switch with a snap action into the other of said positions, and means in said reservoir to move said magnet to actuate said switch.

17. A device of the character described, comprising a casing having a reservoir for liquid fuel, a switch mounted on said casing external of said reservoir, said casing having a wall portion of non-magnetic material separating said switch from said reservoir, an armature operatively connected to said switch and positioned adjacent said wall portion, a magnet in said reservoir and cooperable with said armature through said wall portion, means in said reservoir to move said magnet to actuate said switch, and control means in said reservoir operable by said magnet moving means.

WALTER S. LANDON.

CERTIFICATE OF CORRECTION.

Patent No. 2,178,839. November 7, 1939.

WALTER S. LANDON.

It is hereby certified that error appears in the printed specification of the above numbered patent requiring correction as follows: Page 2, first column, line 21, for the word "secured" read screwed; page 5, second column, line 26, claim 15, strike out "said" before "predetermined"; and the said Letters Patent should be read with this correction therein that the same may conform to the record of the case in the Patent Office.

Signed and sealed this 12th day of December, A. D. 1939.

(Seal)

Henry Van Arsdale,
Acting Commissioner of Patents.